(12) United States Patent
Piepho et al.

(10) Patent No.: US 7,734,735 B2
(45) Date of Patent: *Jun. 8, 2010

(54) AUTOMATIC CONFIGURATION SYSTEM AND METHOD

(75) Inventors: Allen J. Piepho, Windsor, CO (US); Paul Boerger, Loveland, CO (US); Edward S. Beeman, Windsor, CO (US); William L. Devlin, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2173 days.

This patent is subject to a terminal disclaimer.

(21) Appl. No.: 10/285,771

(22) Filed: Nov. 1, 2002

(65) Prior Publication Data

US 2004/0088402 A1 May 6, 2004

(51) Int. Cl.
*G06F 15/16* (2006.01)
(52) U.S. Cl. ...................... 709/220; 709/217
(58) Field of Classification Search ................ 709/220, 709/224, 223
See application file for complete search history.

(56) References Cited

U.S. PATENT DOCUMENTS

| | | | | |
|---|---|---|---|---|
| 5,915,026 A * | 6/1999 | Mankovitz | ............... | 713/168 |
| 6,012,088 A * | 1/2000 | Li et al. | ............... | 709/219 |
| 6,161,133 A * | 12/2000 | Kikinis | ............... | 709/220 |
| 6,314,459 B1 * | 11/2001 | Freeman | ............... | 709/220 |
| 6,370,141 B1 * | 4/2002 | Giordano et al. | ............... | 370/386 |
| 6,622,169 B2 * | 9/2003 | Kikinis | ............... | 709/220 |
| 6,687,817 B1 * | 2/2004 | Paul | ............... | 713/1 |
| 6,701,522 B1 * | 3/2004 | Rubin et al. | ............... | 717/178 |
| 6,704,401 B2 * | 3/2004 | Piepho et al. | ............... | 379/102.03 |
| 6,795,846 B1 * | 9/2004 | Merriam | ............... | 709/203 |
| 6,938,079 B1 * | 8/2005 | Anderson et al. | ............... | 709/222 |
| 7,039,688 B2 * | 5/2006 | Matsuda et al. | ............... | 709/220 |
| 7,146,412 B2 * | 12/2006 | Turnbull | ............... | 709/220 |
| 7,159,016 B2 * | 1/2007 | Baker | ............... | 709/220 |
| 7,240,106 B2 * | 7/2007 | Cochran et al. | ............... | 709/222 |
| 7,260,616 B1 * | 8/2007 | Cook | ............... | 709/218 |
| 7,555,571 B1 * | 6/2009 | Skinner | ............... | 710/10 |
| 2002/0133573 A1 * | 9/2002 | Matsuda et al. | ............... | 709/220 |
| 2003/0061604 A1 * | 3/2003 | Elcock et al. | ............... | 717/170 |
| 2003/0126248 A1 * | 7/2003 | Chambers | ............... | 709/223 |
| 2003/0145096 A1 * | 7/2003 | Breiter et al. | ............... | 709/231 |

* cited by examiner

*Primary Examiner*—John Follansbee
*Assistant Examiner*—Kamal B Divecha

(57) ABSTRACT

One aspect of the invention is an automatic configuration method. The method comprises monitoring a network for data sent by a server in response to a configuring notice, receiving the data, and automatically configuring a processing platform to the network based on the data. Another aspect of the invention is an automatic configuration system. The system comprises a processing platform and application logic operatively associated with the processing platform. The application is operable to monitor a network for data sent by a server in response to a configuring notice, receive the data, and automatically configure the processing platform to the network based on the data.

17 Claims, 1 Drawing Sheet

AUTOMATIC CONFIGURATION SYSTEM AND METHOD

TECHNICAL FIELD OF THE INVENTION

The present invention relates generally to the field of computer systems and, more particularly, to an automatic configuration system and method.

BACKGROUND OF THE INVENTION

Most of today's computer users employ a variety of processing platforms on some sort of network, such as the Internet. For example, some consumers enjoy working and/or playing games on a home PC that is connected to a printer. The user may then connect to the Internet using a variety of methods such as a digital subscriber line (DSL), a dial-up modem, or other methods, and then utilize the PC and printer as components of a small home network. On a larger scale, enterprises may employ various local area networks (LANs), wide area network (WANs), and a variety of implementations to suit their needs. In most cases, the enterprises also have global networking capability through a network such as the Internet.

In order for a network to recognize that a network component or a processing platform is part of the network, the processing platform must be properly configured. Unfortunately, this process requires manual intervention. For example, a user may be required to navigate through several menus or commands to provide information required by a network to and to install the platform on the network. Unfortunately, this method is tedious and prone to errors. Moreover, many users are not familiar with the level of detail required to configure and install a processing platform on a network.

SUMMARY OF THE INVENTION

One aspect of the invention is an automatic configuration method. The method comprises monitoring a network for data sent by a server in response to a configuring notice, receiving the data, and automatically configuring a processing platform to the network based on the data.

Another aspect of the invention is an automatic configuration system. The system comprises a processing platform and application logic operatively associated with the processing platform. The logic is operable to monitor a network for data sent by a server in response to a configuring notice, receive the data, and automatically configure the processing platform to the network based on the data.

Yet another aspect of the invention is an automatic configuration application, which comprises a computer-readable medium, and a software application resident on the computer-readable medium. The software application is operable to monitor a network for data sent by a server in response to a configuring notice, receive the data, and automatically configure the processing platform based on the data.

BRIEF DESCRIPTION OF THE DRAWINGS

For a more complete understanding of the present invention and the advantages thereof, reference is now made to the following descriptions taken in connection with the accompanying drawings and which.

DETAILED DESCRIPTION OF THE DRAWINGS

From the foregoing, it may be appreciated that a need has arisen for providing a method for automatically configuring a system. In accordance with the present invention, an automatic configuration system and method are provided that substantially eliminate or reduce disadvantages and problems of conventional systems.

Figure 1:
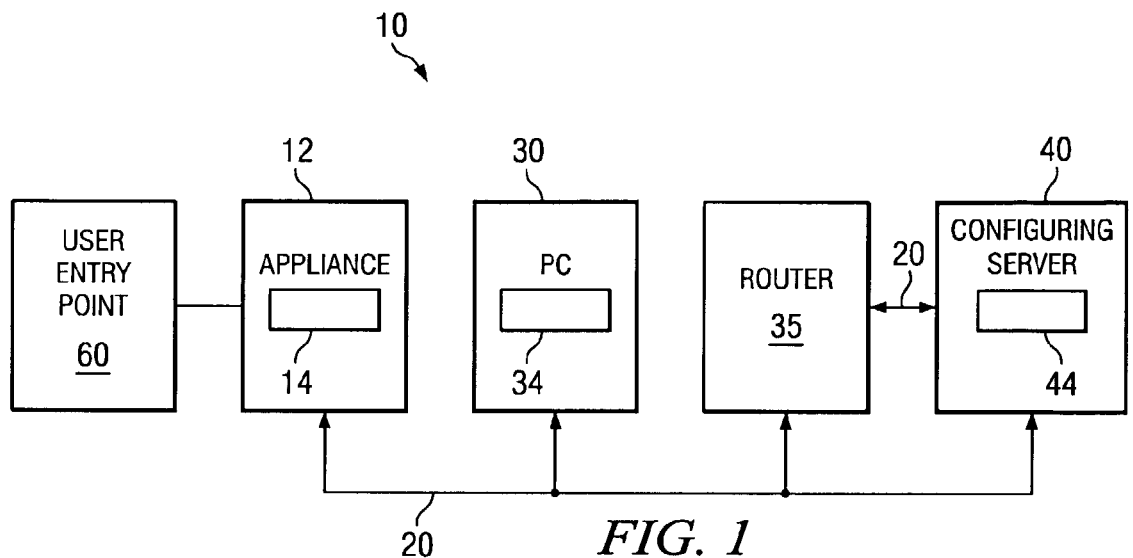
FIG. 1 is a block diagram of an embodiment of an automatic configuration system utilizing teachings of the present of the present invention.

FIG. 1 is a block diagram of an embodiment of an automatic configuration system utilizing teachings of the present invention. In the embodiment illustrated in FIG. 1, automatic configuration system 10 includes the ability for appliance 12 to be automatically configured as an element on network 20 and comprises a PC 30 communicatively coupled to a server 40 over a network 20. Application 14 automatically configures appliance 12 on network 20 based on information received from server 40 and, after its configuration, appliance 12 may communicate over network 20 with other (optional) computers 30 and servers 40. Preferably, a configuring server 40 such as a web server receives a configuring notice and sends configuring identifiers particular to network 20 on which appliance 12 is found. As one example, a configuring notice may be sent as a user accesses server 40 from network 20 by a selected server Uniform Resource Locator (URL), such as <www.hpconfiguration.com>. Appliance 12 monitors network 20 for these configuring identifiers, and then configures itself using the configuring identifiers.

Appliance 12, PC 30, and server 40 may each be any processing platform, such as, but not limited to, a personal computer or a network appliance. An example of PC 30 is a personal computer (PC) operating under the DOS operating system. One example of a network appliance is a digital entertainment center operable to process a plurality of media types, including music. In this scenario, audio files such as .MP3 or .WAV files may be played utilizing appliance 12 as a jukebox with an application such as a .MP3 player or REAL-PLAYER, available from RealNetworks, Inc. One example of a server 40 is a web server operable to host a plurality of web sites recognized by software such as browsers at various URLs. Appliance 12, PC 30, and server 40 may also be general or specific purpose computers; each or any may be a portion of a computer adapted to execute an operating system. Each or any of appliance 12, PC 30, and server 40 may be a wireless device, such as a phone, personal digital assistant, or Internet appliance. The present invention contemplates a variety of other representative configurations, whether conventional or nonconventional, now known or that may be developed in the future.

To further illustrate, a network appliance such as a digital entertainment center comprises a single user entry point 60 or interface, and is operable to process a plurality of media types, including music, "books on tape," lectures, etc. Thus, if appliance 12 is a digital entertainment center, a user entry point 60 allows a consumer-user to perform functions such as, for example, automatically tracking and digitally recording selected music files, and to pause, rewind and instantly replay music programs much like a VCR records and plays back video cassettes. A user entry point 60 may be a GUI with functions such as those described above, or such as those presented with a word processing program such as Word, available from Microsoft Corporation. A user entry point 60 does not enable the consumer-user to access, change, or move files, beyond the extent permitted by the dedicated functions in user entry point 60.

Appliance 12 may be one of a variety of appliances now known or developed in the future. For example, appliance 12 may be an appliance substantially similar to a VCR whose dedicated function is to enable a user to, for example, play, rewind and record video cassettes. The invention contemplates the development of new technologies that encompass traditional household appliances such as, but not limited to, ranges, refrigerators, televisions, and others, whether or not they include a substantial amount of electronic circuitry or logic, such as a stereo. These appliances may be operated by a user through a user entry point 60.

Appliance 12 may also be coupled to at least one suitable network 20 that includes PC 30 or any other element suitable to send configuring notice to server 40, and may or may not include other network elements such as router 35. Router 35 may act as a proxy server in a number of different implementations. For example, where network 20 is an Ethernet network compatible with the TCP/IP protocols, router 35 may act as a proxy server to appliance 12. In this case, router 35 will send data to and receive data from server 40 and other external networks. Router 35 will have an IP address accessible by server 40, and appliance 12 will have an IP address accessible by router 35.

In the embodiment illustrated in FIG. 1, network 20 includes router 35, which communicates with server 40 over indirect or direct communication links. As one example, server 40 may represent a server resident on a telecommunications network such as the Internet. By example and not by limitation, network 20 may a local area network (LAN), wide area network (WAN), a wireless network, an Ethernet network, or a network that conforms with the Home Phoneline Network Appliance (HomePNA) standard, which provides use of a plurality of applications using existing wiring in a location such as a home residence, or other network.

Applications 14, 34 and 44 that reside in, or are operatively associated with, appliance 12, PC 30, and server 40, respectively, may be software, firmware or hardware. Applications 14, 34 and 44 may be, in a particular embodiment, programs or software routines or processes that may be executed by any processor. These programs or routines may be supported by a memory system (not explicitly shown), such as a cache or random access memory (RAM) suitable for storing all or a portion of these programs or routines and/or any other data during various processes performed by these applications. The software code or routines may be implemented using a variety of methods including, but not limited to, object-oriented methods, and using a variety of languages and protocols. Applications 14, 34 and 44 may also be hardware or other logic that may include general circuitry or even special purpose digital circuitry which may be, for example, application-specific integrated circuitry (ASIC), state machines, fuzzy logic. In other embodiments, these applications may include software or firmware that includes procedures or functions and, in some embodiments, may be user-programmable as desired, depending on the implementation. Generally, a method embodiment comprises communicating with server 40 so that server 40 may receive a configuring notice, and send keywords, which may be termed "configuring identifiers," particular to network 20 on which appliance 12 is to be configured. Appliance 12 monitors network 20 for these configuring identifiers, and configures itself using the configuring identifiers. Application 14 may include network analysis and/or DHCP functionality operable to automatically glean selected information sent over network 20.

Configuring identifiers may be any suitable identifiers that enable appliance 12 to configure itself as an element on network 20. For example, in a particular embodiment, these identifiers may be, but are not limited to, a string or strings of words, letters, special characters, or numbers, or any combination thereof. Upon receiving these identifiers, appliance 12 executes at least one application 14 to configure appliance 12. Alternatively, these configuring identifiers may be part of a header to a data packet that includes an executable application 14 that may be downloaded into appliance 12 to configure appliance 12. Configuring identifiers include information to configure appliance 12 to network 20. As one example and not by limitation, where network 20 is an Ethernet network operable to be accessed by, as another example, server 40 on the Internet, configuring identifiers may include the domain name server identifier of PC 30 or IP address of PC 30, proxy server address of PC 30 where network 20 comprises a router 35, or other suitable information. In a particular embodiment, configuring identifiers may include dynamic host configuration protocol (DHCP) information. In a particular embodiment, an application such as a browser includes a four-digit number that may be used for router 35, and a four-digit number for a domain name server (DNS) information for appliance 12 and/or PC 30. For example, configuring information for a server may be an IP address such as 15.15.136.7 and an IP address for a router.

PC 30 or any other element on network 20 other than appliance 12 can be used to send a configuring notice to server 40, or cause the notice to be sent. A configuring notice may be any suitable message data that alerts server 40 to begin sending configuring identifiers to appliance 12. For example, a configuring notice may be configuring instructions to identify specific information associated with appliance 12 such as, but not limited to, serial number, manufacturer, network interface card (NIC) information and others. In a particular embodiment, configuring notice may include executable software or routines that may be downloaded into a server 40 to perform the transmitting of configuring identifiers to appliance 12 if, for example, it is detected that web server 40 does not have such functionality. Alternatively, configuring notice may be a code such as a number or text to inform web server 40 that it should send configuring identifiers for appliance 12 to configure itself upon receipt of those configuring identifiers. Configuration notice may typically be received at a server using a variety of methods such as, but not limited to, messaging systems, manual user input at a graphical user interface (GUI), or a variety of other automatic methods including those at a website such as <www.hpconfiguration.com>.

Figure 2:
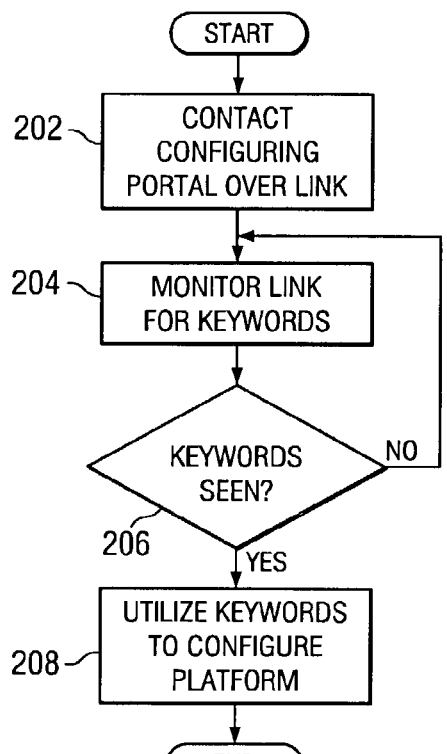
FIG. 2 is an example of a method that may be used in an automatic configuration system utilizing teachings of the present invention.

FIG. 2 is an example of a method that may be used in an automatic configuration system utilizing teachings of the present invention. Generally, the method comprises communicating with configuring server 40 so that configuring server 40 begins to send configuring identifiers particular to network 20 on which appliance 12 is to be configured, appliance 12 monitoring network 20 for these configuring identifiers, and appliance 12 configuring itself on network 20 using the received configuring identifiers. Various embodiments may utilize fewer or more steps, and the method may be performed using a number of different implementations, depending on the application. In the embodiment illustrated in FIG. 2, configuring identifiers are termed "keywords".

In step 202, configuring server 40 may be sent a configuring notice by PC 30 or other remote process to begin sending particular configuring identifiers over network 20 for configuring appliance 12. This step may be performed by, for example, one of applications 14 or 34, or some other remote application or manual process. Application 44, resident on, or associated with, configuring server 40, sends particular configuring identifiers over network 20, as discussed above, for configuring appliance 12.

In step 204, application 14 monitors network 20 for the configuring identifiers sent by configuring server 40. Application 14, in step 206, continues to monitor network 20 until it receives the configuring identifiers for configuration. In step 208, appliance 12 utilizes these configuring identifiers as discussed above to configure itself to the requirements of network 20.

An example may be illustrative. After a user purchases appliance 12, the user follows the set-up information and attaches it to network 20. She uses her home computer to register the appliance by accessing a home page, whether on server 40 or another web server. Automatically, the registration software captures the IP address and serial number of the appliance to identify the appliance. This software automatically sends this information to server 40. Application 44 sends configuring identifiers to the appliance's IP address identified by the user's computer. Appliance 12 monitors the network until it receives these identifiers and configures itself to network 20. Server 40 may receive configuring notice from appliance 12, PC 30, or another process, depending on the implementation.

Embodiments of the invention provide the technical advantage of gleaning a network configuration to automatically configure appliance 12 by appliance 12 receiving configuring identifiers. Such method and system reduces or eliminates the conventional requirement for a user to manually enter information using an interface such as a keyboard or remote panel. Conventional systems typically are very tedious and, in some situations, may be complex. As a result, the present invention reduces or eliminates the errors that are typically associated with conventional systems and methods. In a particular embodiment, this process may be automatically performed upon a selected event, such as, but not limited to, user registration of the appliance.

What is claimed is:

1. An automatic configuration method, comprising:
    sending, by a first processing platform, a configuring notice over a network;
    monitoring, by a second processing platform, the network for data sent by a server in response to the configuring notice;
    receiving the data at the second processing platform; and
    automatically configuring the second processing platform to the network based on the data.

2. The method of claim 1, wherein monitoring a network further comprises monitoring an Ethernet network.

3. The method of claim 1, wherein the automatically configuring comprises at least one of the group consisting of identifying a domain name server for the second processing platform and identifying a proxy server number for the second processing platform.

4. The method of claim 1, wherein receiving data over the network comprises receiving the data from a router electronically connected to a web site.

5. The method of claim 1, wherein automatically configuring the second processing platform comprises automatically configuring an appliance.

6. The method of claim 1, further comprising receiving the configuring notice at a website.

7. An automatic configuration system, comprising:
    a first processing platform; and
    application logic operatively associated with the first processing platform and operable to:
        monitor a network for data sent by a server in response to a configuring notice sent over the network by a second processing platform;
        receive the data; and
        automatically configure the first processing platform to the network based on the data.

8. The system of claim 7, wherein the logic automatically configures by performing at least one of the group consisting of identifying a domain name server for the first processing platform and identifying a proxy server number for the first processing platform.

9. The system of claim 7, wherein the logic is operable to receive data over the network from a router electronically connected to a website.

10. The system of claim 7, wherein the application logic automatically configures the first processing platform by automatically configuring an appliance.

11. The system of claim 7, wherein the configuring notice is received at a website.

12. An automatic configuration application, comprising:
    a computer-readable medium; and
    a software application resident on the computer-readable medium and operable to:
        monitor a network for data sent by a server in response to a configuring notice sent over the network by a first processing platform;
        receive the data; and
        automatically configure a second processing platform to the network based on the data.

13. The application of claim 12, wherein the network is an Ethernet network.

14. The application of claim 12, wherein the software automatically configures by performing at least one of the group consisting of identifying a domain name server for the second processing platform and identifying a proxy server number for the second processing platform.

15. The application of claim 12, wherein the software receives data over the network by receiving the data from a router electronically connected to a web site.

16. The application of claim 12, wherein the second processing platform comprises an appliance.

17. The application of claim 12, wherein the data comprises Domain Name Server (DNS) information.

* * * * *